United States Patent
Ueta et al.

(10) Patent No.: US 9,293,907 B2
(45) Date of Patent: Mar. 22, 2016

(54) PROTECTIVE DEVICE FOR LOAD CIRCUIT

(75) Inventors: Keisuke Ueta, Susono (JP); Akinori Maruyama, Susono (JP); Yoshihide Nakamura, Susono (JP); Yoshinori Ikuta, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 229 days.

(21) Appl. No.: 13/989,849

(22) PCT Filed: Nov. 18, 2011

(86) PCT No.: PCT/JP2011/006446
§ 371 (c)(1),
(2), (4) Date: May 28, 2013

(87) PCT Pub. No.: WO2012/077284
PCT Pub. Date: Jun. 14, 2012

(65) Prior Publication Data
US 2013/0250463 A1   Sep. 26, 2013

(30) Foreign Application Priority Data

Dec. 6, 2010   (JP) .................................. 2010-271247

(51) Int. Cl.
*H02H 1/06* (2006.01)
*H02H 3/08* (2006.01)
(Continued)

(52) U.S. Cl.
CPC ................. *H02H 1/06* (2013.01); *H02H 3/085* (2013.01); *H02H 7/18* (2013.01); *H02H 5/041* (2013.01); *H02H 6/005* (2013.01)

(58) Field of Classification Search
CPC ......... H02H 1/06; H02H 3/085; H02H 5/041; H02H 6/005; H02H 7/18

USPC .............................................. 361/93.8
See application file for complete search history.

(56) References Cited

U.S. PATENT DOCUMENTS

2007/0035896 A1\* 2/2007 Kobayashi et al. ............. 361/23
2007/0253132 A1  11/2007 Nakamura et al.
(Continued)

FOREIGN PATENT DOCUMENTS

CN    1337565 A    2/2002
CN    1901312 A    1/2007
(Continued)

OTHER PUBLICATIONS

Machine translation of WIPO Publication WO2010113916A1, Higuchi et al. Oct. 7, 2010.\*
(Continued)

*Primary Examiner* — Thienvu Tran
*Assistant Examiner* — Kevin J Comber
(74) *Attorney, Agent, or Firm* — Mots Law, PLLC

(57) ABSTRACT

A load circuit protective device calculates increasing temperature of wire of a load circuit with a first predetermined sampling period (dt1) determined by a clock signal for normal operation when a semiconductor relay (Q1) is on to estimate the temperature of the wire. The temperature of the wire is therefore estimated with high accuracy. Moreover, when the semiconductor relay (Q1) is off, the load circuit protective device calculates decreasing temperature of the wire of the load circuit with a second predetermined sampling period (dt2) to estimate the temperature of the wire. The second predetermined sampling period (dt2) is determined by a clock signal for power-saving operation and is longer than the first predetermined sampling period (dt1). Accordingly, the calculation times of the temperature can be reduced, and the power consumption is therefore reduced.

3 Claims, 4 Drawing Sheets

(51) Int. Cl.
*H02H 7/18* (2006.01)
*H02H 5/04* (2006.01)
*H02H 6/00* (2006.01)

(56) References Cited

U.S. PATENT DOCUMENTS

2009/0039807 A1* 2/2009 Yabusaki et al. ............ 318/244
2010/0254059 A1 10/2010 Higuchi et al.

FOREIGN PATENT DOCUMENTS

| CN | 201374690 Y | 12/2009 |
| CN | 101861689 A | 10/2010 |
| JP | 2007-053894 A | 3/2007 |
| JP | 2009-130944 A | 6/2009 |
| JP | 2010-239835 A | 10/2010 |
| WO | WO 2010113916 A1 * | 10/2010 |

OTHER PUBLICATIONS

The Chinese office action issued on Jul. 3, 2014 in the counterpart China patent application.
The Japanese official action issued on Aug. 12, 2014 in the counterpart Japan patent application. (Partial English translation also submitted.).
The Chinese office action letter issued on Mar. 16, 2015 in the counterpart Chinese patent application.
Chinese office action issued on Sep. 14, 2015 in the counterpart Chinese patent application.

* cited by examiner

PROTECTIVE DEVICE FOR LOAD CIRCUIT

TECHNICAL FIELD

The present invention relates to a protective device to instantly break a load circuit when excess current flows through the load circuit to increase the temperature of a semiconductor relay or wire and specifically relates to a technique to reduce power consumption.

BACKGROUND ART

A load circuit for supplying electric power to a load such as a lamp or a motor mounted on a vehicle includes a battery and a semiconductor relay (MOSFET or the like) provided between the battery and the load. The battery, the semiconductor relay, and the load are connected through conductors including wires. The load circuit further includes a control circuit for on/off operations of the semiconductor relay. According to drive/stop signals outputted from the control circuit, the semiconductor relay is turned on/off to switch between drive and stop of the load.

In such a load circuit, if excess current flows through the load circuit, it is necessary to instantly break the load circuit to protect the load, wire, semiconductor relay, and the like. Accordingly, a method is proposed which measures load current at each predetermined sampling period; estimates wire temperature based on a period of time when the load current flows; and when the estimated temperature reaches a previously set threshold temperature, turns off the semiconductor relay (see PTL 1).

FIG. 1 is a characteristic diagram illustrating changes in wire temperature estimated by using a temperature estimation method disclosed in PTL 1. In FIG. 1, if the semiconductor relay is turned on at time t21, the wire temperature gradually increases (see a curve q11). After the wire temperature reaches a saturation temperature for normal current, the wire temperature is stabilized at this saturation temperature. At this time, the estimation of the increasing wire temperature is performed at intervals of a predetermined sampling period dt.

If the semiconductor relay is turned off at time t22, the wire starts to release heat at this point of time, and the temperature thereof gradually decreases to reach the ambient temperature. Even after the semiconductor relay is turned off, it is therefore necessary to calculate heat released from the wire and estimate the temperature of the wire. Accordingly, the calculation logic for the wire temperature executes the calculation until the wire temperature reaches the ambient temperature. If the logic to calculate the wire temperature is not executed while the wire is releasing heat, it is determined that the wire temperature is equal to the ambient temperature when the semiconductor relay is again turned on before the wire temperature decreases to the ambient temperature. In this case, the subsequent estimation of temperature cannot be executed. At this time, estimation of the temperature of wire releasing heat is executed at intervals of the predetermined sampling period dt.

CITATION LIST

Patent Literature

[PTL 1]
WO 2009/066564 A1

SUMMARY OF INVENTION

As described above, in the conventional protective device for a load circuit, the calculation logic to estimate the wire temperature continues to operate until the wire temperature reaches the ambient temperature after the semiconductor relay is turned off. The conventional protective device therefore consumes a lot of power. Accordingly, there is an increasing demand for reduction in power consumption.

The present invention was made to solve the aforementioned problem, and an object of the present invention is to provide a protective device for a load circuit which consumes less power after the semiconductor relay is turned off.

To achieve the aforementioned object, a load circuit protective device according to a first aspect of the present invention is a protective device for breaking a load circuit when temperature of a wire of the load circuit increases, the load circuit supplying electric power outputted from a power supply to a load and driving the same, the protective device including: a current sensor for detecting current flowing through the wire of the load circuit; an electronic switch for switching between connection and disconnection of the load circuit; a sampling period setter for setting a sampling period; a temperature estimator for estimating temperature of the wire with the sampling period set by the sampling period setter based on the current detected by the current sensor; and a switch controller for turning off the electronic switch when the temperature of the wire estimated by the temperature estimator reaches a previously set threshold temperature. In the protective device, the sampling period setter sets the sampling period to a first predetermined sampling period when the electronic switch is on and sets the sampling period to a second predetermined sampling period longer than the first predetermined sampling period when the electronic switch is off.

Preferably, the load circuit protective device according to the first aspect of the present invention further includes a sleep mode setter which, when the electronic switch is turned off and the temperature of the wire estimated by the temperature estimator is reduced to less than a sleep threshold, sets a sleep mode to stop an output of an internal power supply supplying electric power to the protective device.

At this time, preferably, the sleep mode setter releases the sleep mode to starts power supply from the internal power supply when receiving an instruction to drive the electronic switch while the internal power supply is in the sleep mode.

In the load circuit protective device according to the first aspect of the present invention, the temperature of the wire of the load circuit is estimated with the first predetermined sampling period when the electronic switch provided for the load circuit is on and is estimated with the second predetermined sampling period longer than the first predetermined sampling period when the electronic switch provided for the load circuit is off. Accordingly, the temperature of the wire can be estimated with high accuracy while current is flowing in the load circuit, and the calculation times of the temperature of the wire can be reduced while no current is flowing in the load circuit, thus reducing the power consumption.

Moreover, the estimation of the temperature of the wire is continued after the electronic switch is turned off, and the internal power supply is switched to the sleep mode when the temperature of the wire is reduced to less than the previously set sleep threshold. Accordingly, the power output of the internal power supply can be efficiently stopped, and the power consumption can be further reduced.

Furthermore, the sleep mode is released when the instruction to drive the electronic switch is received. Accordingly, the electronic switch can be instantly turned on to drive the load circuit.

DESCRIPTION OF EMBODIMENTS

Hereinafter, an embodiment of the present invention is described based on the drawings.

Figure 1:
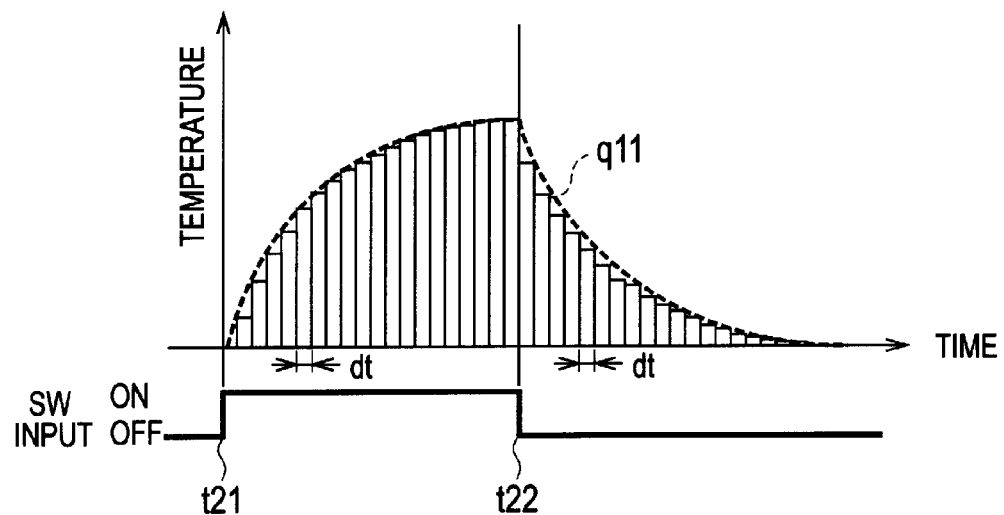
FIG. 1 is a timing diagram illustrating switch inputs and variation in wire temperature in a conventional protective device for a load circuit.
Figure 2:
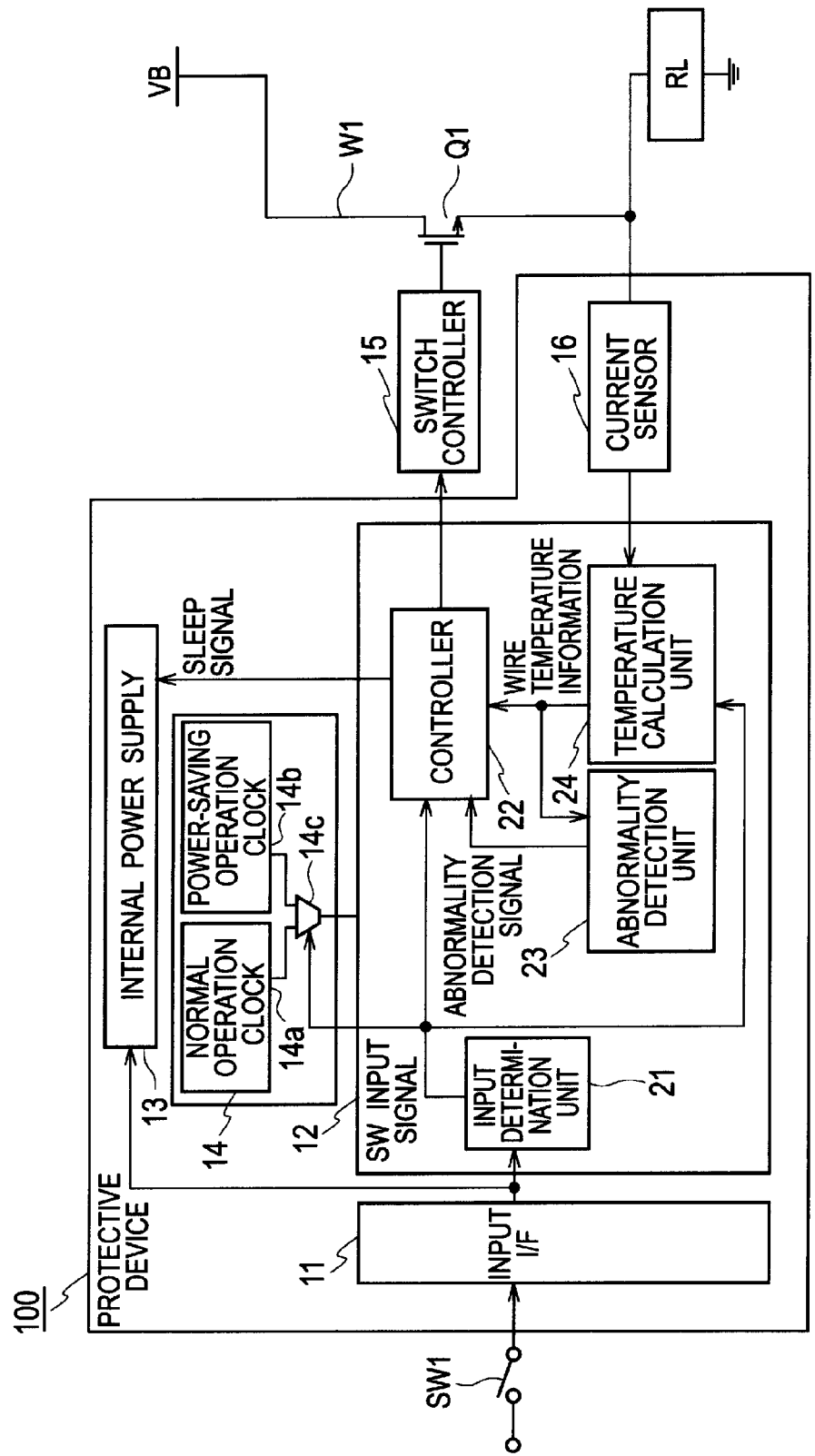
FIG. 2 is a block diagram illustrating a configuration of a protective device for a load circuit according to an embodiment.

As illustrated in FIG. 2, a load circuit protective device 100 according to an embodiment includes a function of: when excess current flows in a load circuit including a battery VB mounted on a vehicle, a semiconductor relay Q1, for example such as a MOSFET, and a load RL to overheat a wire W1 of the load circuit, turning off the semiconductor relay Q1 to protect the entire load circuit against overheating. The semiconductor relay Q1 is driven by a drive instruction signal outputted from a switch controller 15.

As illustrated in FIG. 2, the load circuit protective device 100 includes an input I/F 11, a logic circuit 12, an internal power supply 13, a clock circuit 14 (a sampling period setter), and a current sensor 16 detecting current flowing in the load circuit.

When an externally provided switch SW1 is turned on, the input I/F 11 detects that the switch SW1 is turned on and outputs an on instruction signal to the logic circuit 12 and an internal power supply start signal to the internal power supply 13.

The internal power supply 13 includes a function of generating a desired constant voltage from voltage supplied from the battery VB and supplying driving power to each element of the protective device 100. When supplied with the internal power supply start signal from the input I/F 11, the internal power supply 13 supplies output voltage to each element. When supplied from the logic circuit 12 with a sleep signal to stop the internal power supply, the internal power supply 13 stops outputting voltage. In other words, the internal power supply 13 operates at a normal mode when receiving the internal power supply start signal and goes into a sleep mode to stop outputting power when being supplied with the sleep signal.

The clock circuit 14 includes a normal operation clock output unit 14a for outputting a clock signal for normal operation; a power-saving operation clock output unit 14b for outputting a clock signal for power-saving operation; and a selector 14c for selecting one of outputs from the normal operation clock output unit 14a and the power-saving operation clock output unit 14b in an alternative way and outputting the selected one to the logic circuit 12.

The current sensor 16 detects current flowing in the load circuit and outputs the detected current signal to the logic circuit 12. The method of detecting current can be a method using shunt resistor, a method using current measured by a multi-source FET as the semiconductor relay Q1, or the like.

The logic circuit 12 further includes an input determination unit 21 which, when the on instruction signal is outputted from the input I/F 11, outputs the on instruction signal to the controller 22, a clock switching signal to the selector 14c of the clock circuit 14, and a temperature measurement instruction signal to a temperature calculation unit (temperature estimator) 24.

When supplied with the temperature measurement instruction signal from the input determination unit 21, the temperature calculation unit 24 calculates a heat-generating temperature or a heat-releasing temperature of a wire W1 at each sampling period and estimates current temperature of the wire W1 based on the current value measured by the current sensor 16 and the sampling period determined by the normal operation clock signal or power-saving operation clock signal outputted from the clock circuit 14. At this time, the sampling period determined by the normal operation clock signal (referred to as a first predetermined sampling period dt1) is a shorter period (or has a higher frequency) than the sampling period determined by the power-saving operation clock signal (referred to as a second predetermined sampling period dt2). The method of estimating the wire temperature is described later. The wire temperature information calculated by the temperature calculation unit 24 is outputted to the controller 22 and abnormality detection unit 23.

The abnormality detection unit 23 outputs an abnormality detection signal to the controller 22 when the wire temperature reaches a previously set threshold temperature (for example 100 degrees Celsius) based on the wire temperature calculated by the temperature calculation unit 24.

The controller 22 outputs a drive instruction signal to the switch controller 15 when the on instruction signal is supplied from the input determination unit 21. The switch controller 15 then outputs a drive signal to a control terminal of the semiconductor relay Q1 (for example, the gate of an MOSFET), and the semiconductor relay Q1 is turned on to drive the load RL. By contrast, when the on instruction signal supplied from the input determination unit 21 is stopped, the switch controller 15 stops outputting the drive instruction signal. The semiconductor relay Q1 is then turned off to stop the load RL.

Furthermore, when the abnormality detection signal is supplied from the abnormality detection unit 23, the controller 22 stops the output of the drive instruction signal to forcibly turn off the semiconductor relay Q1. Moreover, when the wire temperature calculated by the temperature calculation unit 24 is reduced to a previously set sleep threshold (temperature set a little higher than the ambient temperature), the controller 22 outputs the sleep signal to the internal power supply 13. When receiving the sleep signal, the internal power supply 13 goes into a sleep mode in which the output of voltage from the internal power supply 13 is stopped. In other words, the controller 22 includes a function as a sleep mode setter configured to set the sleep mode in which the output of voltage is stopped after the semiconductor relay Q1 is turned off and the wire temperature estimated by the temperature calculation unit 24 is reduced to less than the sleep threshold.

Next, the procedure of calculation of the wire temperature by the temperature calculation unit 24 is described. The calculation of the wire temperature can be performed using a method described in JP 2010-158108 A, for example. When the semiconductor relay Q1 is turned on to allow load current to flow through the wire W1 of the load circuit, energy consumed by the wire W1 (Pcin) can be calculated by the following equation (1).

$$Pcin = rcI^2 \qquad (1)$$

where rc is conductor resistance [ohm] of the wire W1 and I is flowing current [A].

When the semiconductor relay Q1 is off, energy released from the wire W1 (Pcout) can be calculated by the following equation (2).

$$Pcout = Qc(n-1)/(Cth\, Rth) \qquad (2)$$

Herein, Rth is thermal resistance of the wire W1 [K/W]; Cth, thermal capacity of the wire W1 [J/K]; and Qc(n−1), an amount of heat of the wire W1 at the previous sampling.

Furthermore, the difference (Pcin−Pcout) between the consumed energy Pcin and the released energy Pcout is calculated based on the equations (1) and (2) and is multiplied by the sampling period dt (10 [ms], for example) to calculate an amount of heat generated or released by the wire W1 for each sampling period. Accordingly, by the following equation (3), an amount Qc(n) of heat accumulated in the wire W1 at the current time can be obtained.

$$Qc(n) = Qc(n-1) + (Pcin - Pcout)dt \qquad (3)$$

Moreover, the amount of heat Qc(n) calculated by the equation (3) is divided by the thermal capacity Cth of the wire W1 to obtain a temperature increase dT of the wire W1. The temperature increase dT is calculated by the following equation (4).

$$dT = Qc(n)/Cth \qquad (4)$$

Then, the temperature increase dT calculated by the equation (4) is added to the ambient temperature, thus obtaining the temperature of the wire W1. The thus-obtained wire temperature information is outputted to the controller 22 and abnormality detection unit 23.

Next, a description is given of a sleep mode setting process and a wire temperature calculation process in the load circuit protective device 100 according to the embodiment configured as described above.

Figure 3:
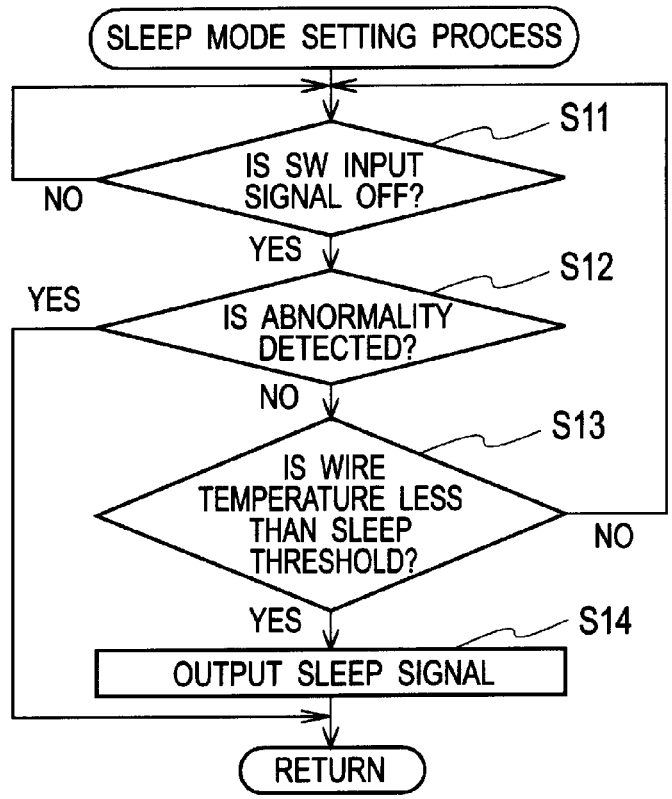
FIG. 3 is a flowchart illustrating a procedure of a sleep mode setting process executed by the protective device for a load circuit according to the embodiment.

FIG. 3 is a flowchart illustrating a procedure of the sleep mode setting process by the controller 22. First, in step S11, the controller 22 determines whether the input of the switch SW1 is off. If the input of the switch SW1 is on (NO in the step S11), the protective device 100 operates at the normal mode, and the sleep mode setting process is not performed.

If the switch SW1 is off (YES in the step S11), the controller 22 determines in step S12 by the abnormality detection unit 23 whether the wire temperature is abnormal. Specifically, the controller 22 determines whether excess current flows in the load circuit to increase the wire temperature to an upper threshold. If the wire temperature is abnormal (YES in the step S12), the protective device 100 is operated at the normal mode, and this process is terminated.

Moreover, if the wire temperature is not abnormal (NO in the step S12), in step S13, the controller 22 determines whether the wire temperature of the load circuit is less than the sleep threshold. If the wire temperature is not less than the sleep threshold, the normal mode is maintained, and this process is terminated. Specifically, if the wire temperature is not reduced to less than sleep threshold, it is necessary to continue to calculate the heat releasing temperature of the wire W1, and the protective device 100 is therefore operated at the normal mode.

On the other hand, if the wire temperature is less than the sleep threshold, in step S14, the controller 22 outputs the sleep signal to the internal power supply 13 to stop supplying power from the internal power supply 13. The protective device 100 then goes into the sleep mode, and the power consumption can be reduced. Thereafter, if the switch SW1 is turned on, the internal power sully start signal is outputted to switch from the sleep mode to the normal mode.

In such a manner, the protective device 100 calculates the heat releasing temperature of the wire W1 after the input of the switch SW1 is turned off. When the estimated wire temperature is reduced to the sleep threshold (temperature a little higher than the ambient temperature), the protective device 100 goes to the sleep mode. The wire temperature can be therefore known at each point of time until the protective device 100 goes to the sleep mode. When the switch SW1 is again turned on before the protective device 100 goes to the sleep mode, the wire temperature can be continuously estimated.

Figure 4:
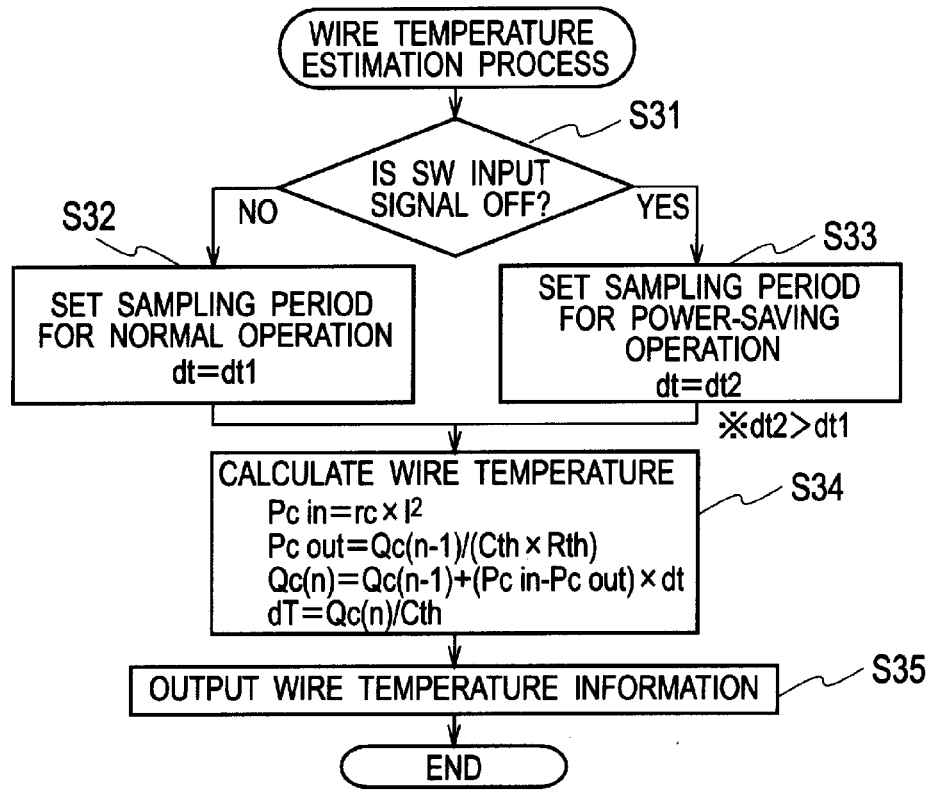
FIG. 4 is a flowchart illustrating a procedure of a wire temperature estimation process executed by the protective device for a load circuit according to the embodiment.

Next, the procedure of the wire temperature estimation process by the temperature calculation unit 24 is described with reference to the flowchart illustrated in FIG. 4. First, in step S31, the temperature calculation unit 24 determines whether the input of the switch SW1 is off. If the input of the switch SW1 is not off (NO in the step S31), the process proceeds to step S32. If the input of the switch SW1 is off (YES in the step S31), the process proceeds to step S33.

In the step S32, the temperature calculation unit 24 sets the sampling period dt for calculation of the wire temperature to the first predetermined sampling period dt1 used in normal time. Specifically, the temperature calculation unit 24 sets the sampling period to the first predetermined sampling period dt1 based on the clock outputted from the normal operation clock output unit 14a. Thereafter, the process proceeds to step S34.

In the step 33, the temperature calculation unit 24 sets the sampling period dt for calculation of the wire temperature to the second predetermined sampling period dt2 used in the power-saving operation. Specifically, the temperature calculation unit 24 sets the sampling period to the second predetermined sampling period dt2 based on the clock outputted from the power-saving operation clock output unit 14b. Herein, the second predetermined sampling period dt2 is longer than the first predetermined sampling period dt1. The sampling is therefore performed in the normal operation with a higher frequency than in the power-saving operation. Thereafter, the process proceeds to the step S34.

In the step S34, the temperature calculation unit 24 calculates the temperature increase dT and estimates the current wire temperature based on the calculation logic of the equations (1) to (4). Accordingly, current wire temperature can be obtained at each sampling period. In this process, when the switch SW1 is on, the wire temperature is calculated with the sampling period dt set to the first predetermined sampling period dt1. When the switch SW1 is off, the wire temperature is calculated with the sampling period dt set to the second predetermined sampling period dt2. In other words, when the switch SW1 is on, the wire temperature is calculated with a high frequency, and when the switch SW1 is off, the wire temperature is calculated with a low frequency. The process then proceeds to step S35.

In the step S35, the temperature calculation unit 24 outputs the wire temperature information calculated by the aforementioned process to the abnormality detection unit 23 and the controller 22. The wire temperature estimation process is thus performed.

Thereafter, based on the calculated wire temperature, when the wire temperature is reduced to less than the sleep threshold, the controller 22 sends the sleep signal to the internal power supply 13 to bring the entire protective device 100 into the sleep mode. Moreover, when the abnormality detection unit 23 determines that the wire temperature calculated by the temperature calculation unit 24 exceeds the upper threshold, the abnormality detection unit 23 outputs the abnormality detection signal to the controller 22. The controller 22 then stops the drive signal of the semiconductor relay Q1 to break the load circuit, thus protecting the load circuit against excess current.

Figure 5:
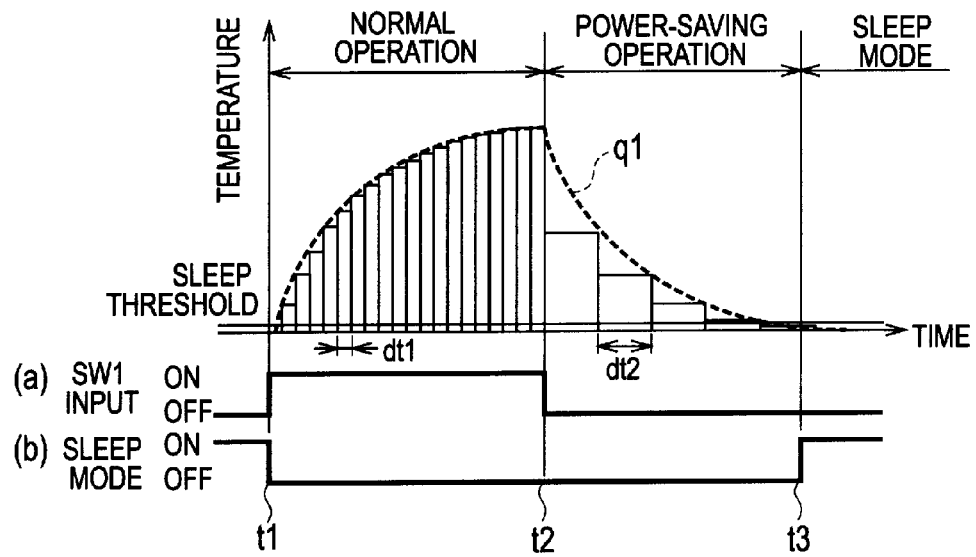
FIG. 5 is a timing diagram illustrating movements of a switch SW1, changes in wire temperature, and changes in sampling period in the protective device for a load circuit according to the embodiment.

Next, a description is given of switching of the switch SW1 and changes in wire temperature with reference to the timing diagram illustrated in FIG. 5. As illustrated by a waveform (a) of FIG. 5, if the switch SW1 is turned on at time t1, the switch controller 15 outputs the instruction signal to drive the semiconductor relay Q1, and the semiconductor relay Q1 is turned on. Current then flows in the load circuit. At this time, as illustrated by a waveform (b) of FIG. 5, the sleep mode is turned off.

When current flows in the load circuit, as illustrated by a curve q1 of FIG. 5, the wire temperature starts to increase with time and then reaches the saturation temperature. At this time, the temperature calculation unit 24 calculates the wire temperature with the first predetermined sampling period dt1 (see the step S32 of FIG. 4), thus implementing very accurate estimation of the wire temperature.

Subsequently, when the switch SW1 is turned off at time t2, the drive instruction signal outputted from the switch controller 15 is stopped. The semiconductor relay Q1 is therefore turned off, and the wire W1 of the load circuit starts to release heat. The wire temperature therefore starts to gradually decrease with time. At this time, the temperature calculation unit 24 calculates the wire temperature with the second predetermined sampling period dt2 (see the step S33 of FIG. 4). The wire temperature is estimated with a longer period.

Thereafter, when the wire temperature is reduced to less than the sleep threshold at time t3, the power outputted from the internal power supply 13 is shut off, and the protective circuit 100 is switched to the sleep mode. By such an operation, after the switch SW1 is turned off at the time t2, the wire temperature is estimated with the second predetermined sampling period dt2 longer than the first predetermined sampling period dt1. Accordingly, the number of times of calculation can be less than that of calculation with the first predetermined sampling period dt1. The power consumption can be therefore reduced during a period after the switch SW1 is turned off before the protective device 100 is switched to the sleep mode.

In this case, by increasing the sampling period, the number of times of calculation of temperature per unit time is reduced. However, since no current flows in the load circuit, the calculation of temperature does not need to correspond to quick changes in temperature. Accordingly, the reduction in number of times of calculation will not degrade the accuracy of the temperature calculation so much.

Figure 6:
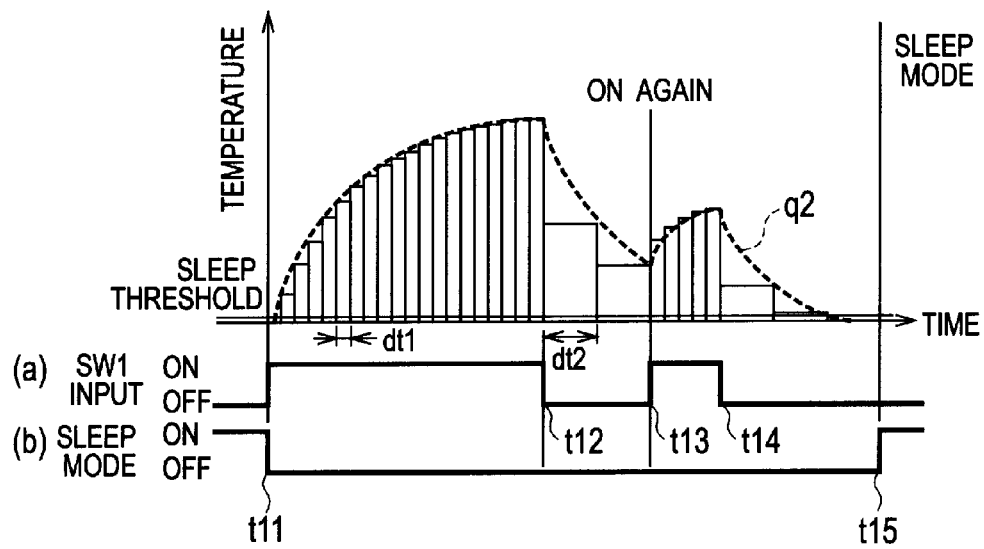
FIG. 6 is a timing diagram illustrating movements of the switch SW1, changes in wire temperature, and changes in sampling period in the protective device for a load circuit according to the embodiment, the diagram illustrating a case where the switch SW1 is turned on again.

Next, with reference to the timing diagram illustrated in FIG. 6, a description is given of changes in wire temperature in the case where the wire starts to release heat and the switch SW1 is turned on again before the wire temperature reaches the sleep threshold. As illustrated by a waveform (a) of FIG. 6, if the switch SW1 is turned on at time t11, the switch controller 15 outputs the drive instruction signal for the semiconductor relay Q1, and the semiconductor relay Q1 is turned on. Current then flows in the load circuit. At this time, the sleep mode is turned off as illustrated by a waveform (b) of FIG. 6.

As illustrated by a curve q2 of FIG. 6, the wire temperature starts to increase with time and then reaches the saturation temperature. At this time, the temperature calculation unit 24 calculates the wire temperature with the first predetermined sampling period dt1, thus implementing very accurate estimation of the wire temperature.

Subsequently, if the switch SW1 is turned off at time t12, the drive instruction signal outputted from the switch controller 15 is stopped, and the semiconductor relay Q1 is turned off. The wire W1 of the load circuit then starts to release heat. The wire temperature therefore starts to gradually decrease with time. At this time, the temperature calculation unit 24 calculates the wire temperature with the second predetermined sampling period dt2.

Thereafter, if the switch SW1 is turned on again at time t13, the temperature calculation unit 24 switches again from the second predetermined sampling period dt2 to the first predetermined sampling period dt1 based on the wire temperature obtained at the time t13. The temperature calculation unit 24 then calculates the heat generating temperature of the wire W1 with the first predetermined sampling period dt1 and estimates the wire temperature.

If the switch SW1 is turned off at time t14, the sampling period is changed to the second predetermined sampling period dt1, and the decreasing temperature of the wire W1 is calculated. When the wire temperature is then reduced to less than the sleep threshold at time t15, the power outputted from the internal power supply 13 is shut off, and the protective device 100 is switched to the sleep mode.

As described above, even in the case where the switch SW1 is frequently turned on and off, the temperature of the wire W1 is calculated with the first predetermined sampling period dt1 when the switch SW1 is on to allow current to flow in the load circuit. When the switch SW1 is off, the temperature of the wire W1 is calculated with the second predetermined sampling period dt2. Accordingly, the wire temperature can be measured with high accuracy while current is flowing through the wire W1 to increase the temperature of the wire W1. When current is shut off, the sampling period is increased to reduce the power consumption.

In such a manner, in the load circuit protective device 100 according to the embodiment, control is made as follows: while the semiconductor relay Q1 is on and current is flowing in the load circuit, the wire temperature is calculated with the first predetermined sampling period dt1, and while the semiconductor relay Q2 is off and no current is flowing in the load circuit, the wire temperature is calculated with the second predetermined sampling period dt2 (dt2>dt1). Accordingly, when current is flowing in the load circuit, the increasing temperature of the wire W1 is calculated frequently to implement highly accurate estimation of the wire temperature. Moreover, while no current is flowing in the load circuit, the number of calculation times is reduced, thus reducing the power consumption until the protective device 100 is switched to the sleep mode.

Hereinabove, the load circuit protective device of the present invention is described based on the embodiment illustrated in the drawings. The present invention is not limited to this, and the configuration of each unit can be substituted with one including an arbitrary configuration and equivalent functions.

For example, in the above description of the embodiment, the electronic switch is the semiconductor relay such as a MOSFET. However, the present invention is not limited this, and the electronic switch can be a contact-type relay.

INDUSTRIAL APPLICABILITY

In a protective device configured to estimate the temperature of the wire W1 and detect overheating of the wire W1, the present invention is useful to reduce power consumption after the switch SW1 is turned off.

The invention claimed is:

1. A load circuit protective device for turning a load circuit off when temperature of a wire of the load circuit increases, the load circuit supplying electric power outputted from a power supply to a load and driving the same, the protective device comprising:
   a current sensor for detecting current flowing through the wire of the load circuit;
   an electronic switch for switching between on and off of the load circuit;
   a sampling period setter for setting a sampling period;
   a temperature estimator for estimating temperature of the wire, from the difference which is calculated between the consumed energy in the wire and the released energy from the wire, based on the current detected by the current sensor, with the sampling period set by the sampling period setter based on the current detected by the current sensor; and
   a switch controller for turning off the electronic switch when the temperature of the wire estimated by the temperature estimator reaches a previously set threshold temperature, wherein
   the sampling period setter sets the sampling period to a first predetermined sampling period as provided by a first clock when the electronic switch is on and sets the sampling period to a second predetermined sampling period longer than the first predetermined sampling period as provided by a second clock different from the first clock when the electronic switch is off.

2. The load circuit protective device of claim 1, further comprising
   a sleep mode setter which, when the electronic switch is turned off and the temperature of the wire estimated by the temperature estimator is reduced to less than a sleep threshold, sets a sleep mode to stop an output of an internal power supply supplying electric power to the protective device.

3. The load circuit protective device of claim 2, wherein the sleep mode setter releases the sleep mode to starts power supply from the internal power supply when receiving an instruction to drive the electronic switch while the internal power supply is in the sleep mode.

* * * * *